March 30, 1965 S. M. MOBERG 3,175,938
POULTRY TAGGING DEVICE
Filed June 5, 1963 5 Sheets-Sheet 1
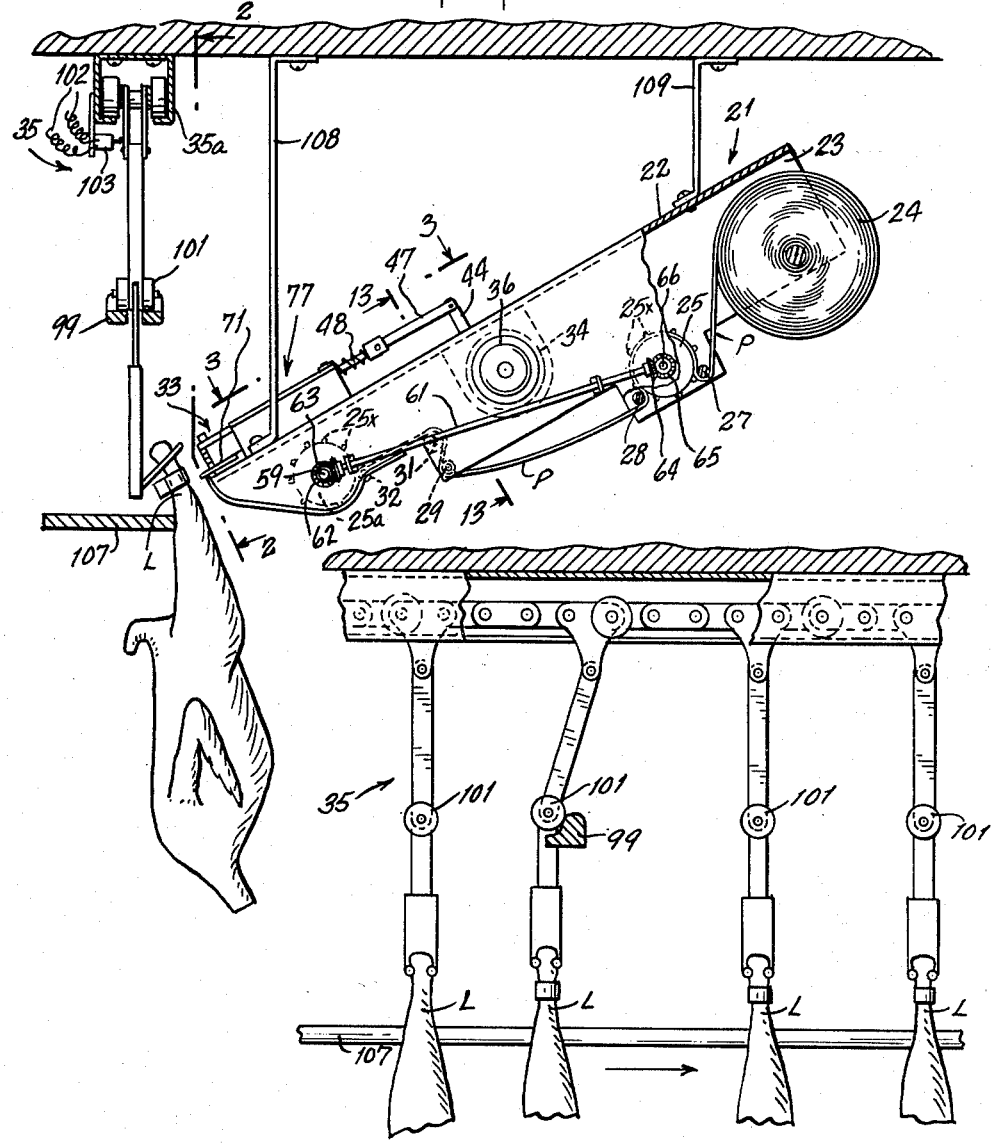
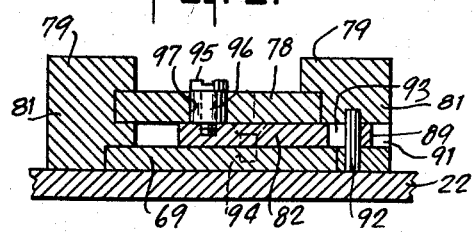
INVENTOR:
SIGURD M. MOBERG
BY Robert Henderson
ATTORNEY

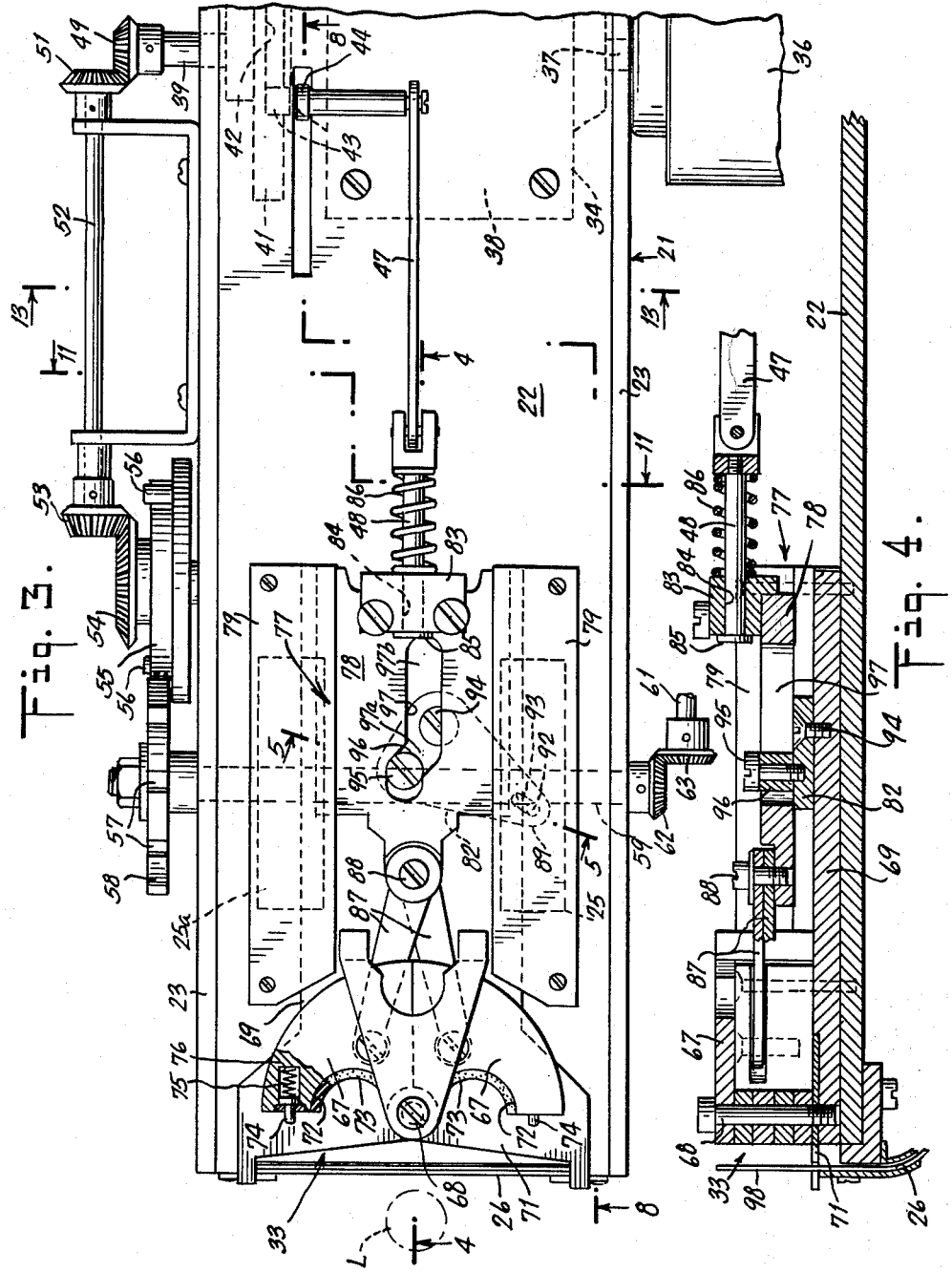

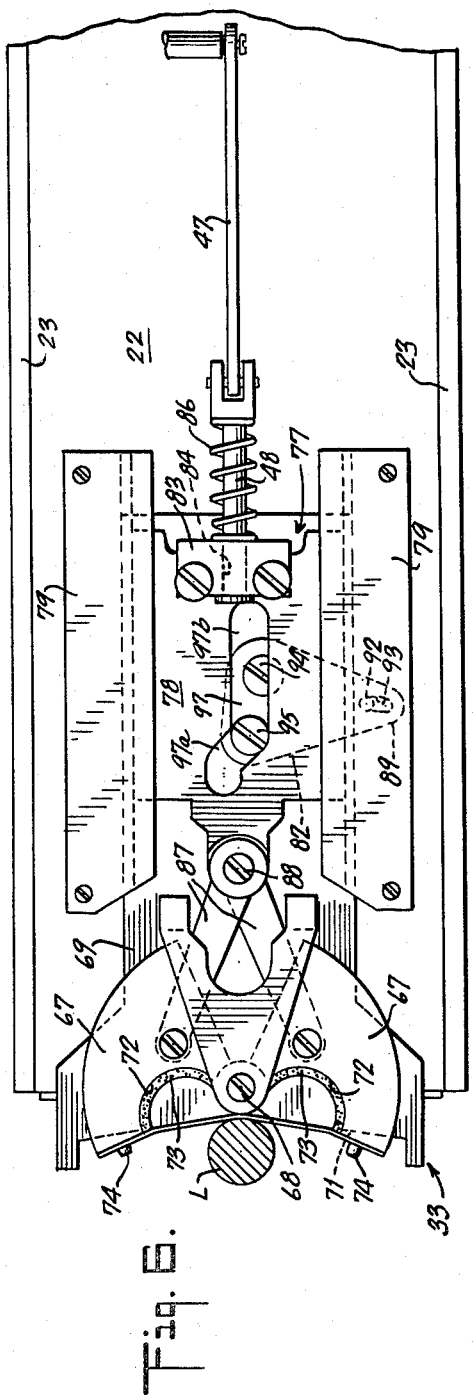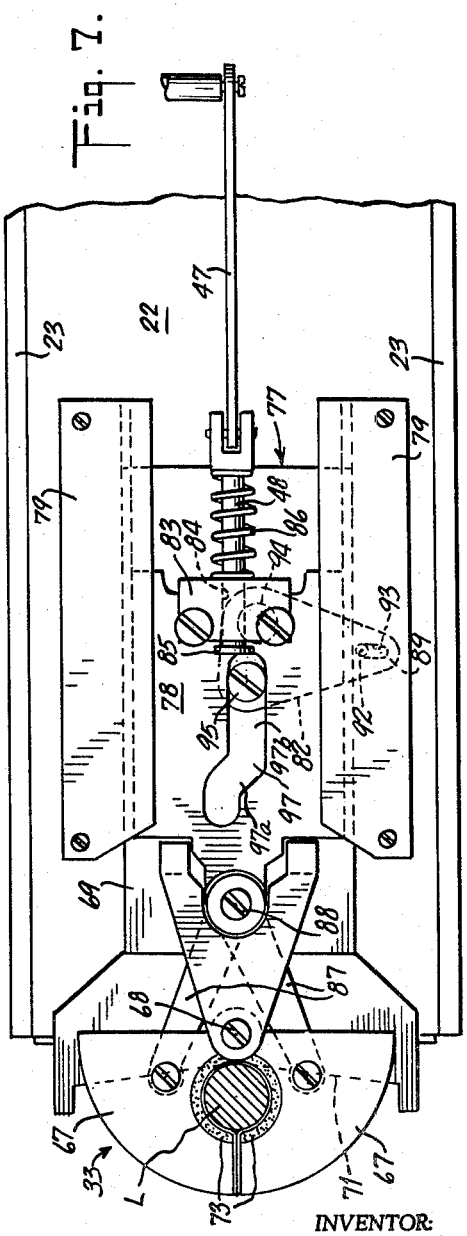

March 30, 1965 S. M. MOBERG 3,175,938
POULTRY TAGGING DEVICE
Filed June 5, 1963 5 Sheets-Sheet 4
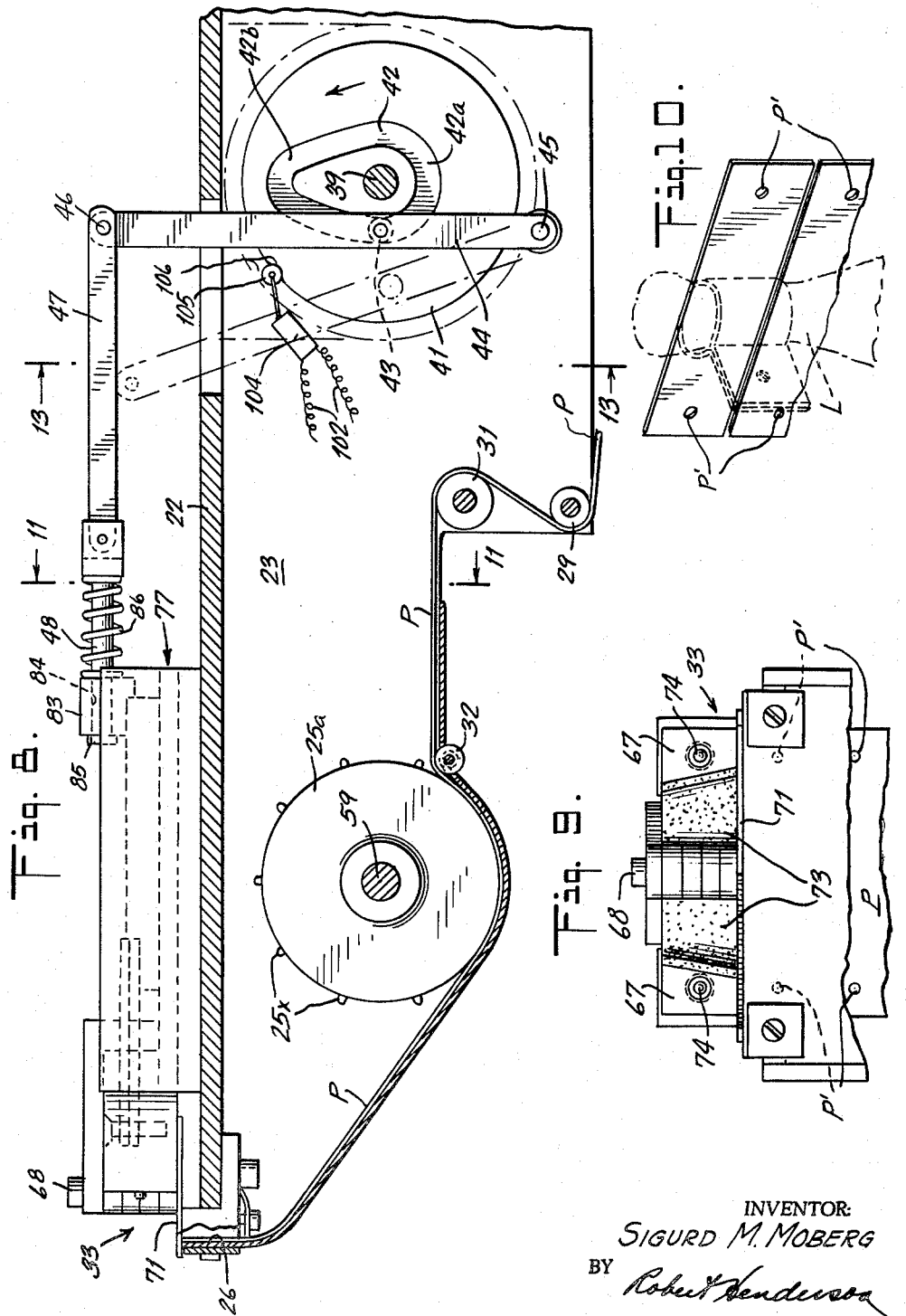
INVENTOR:
SIGURD M. MOBERG
BY Robert Henderson
ATTORNEY

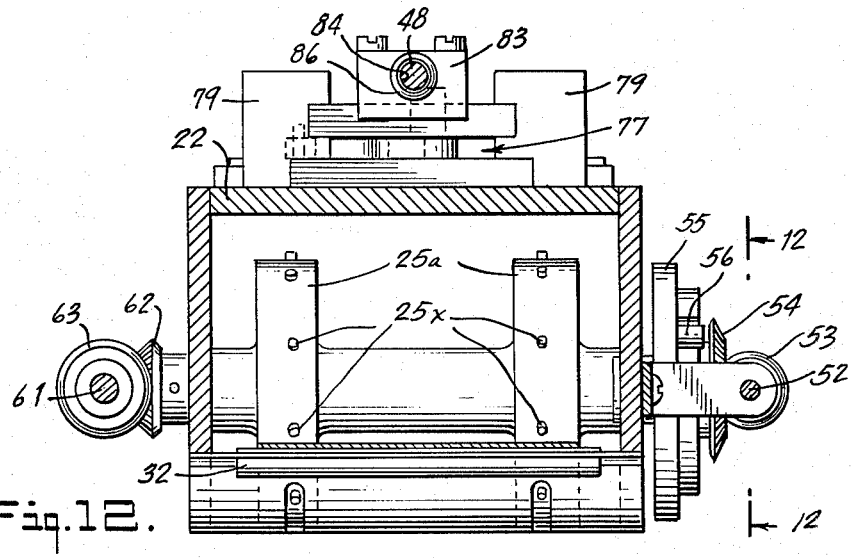
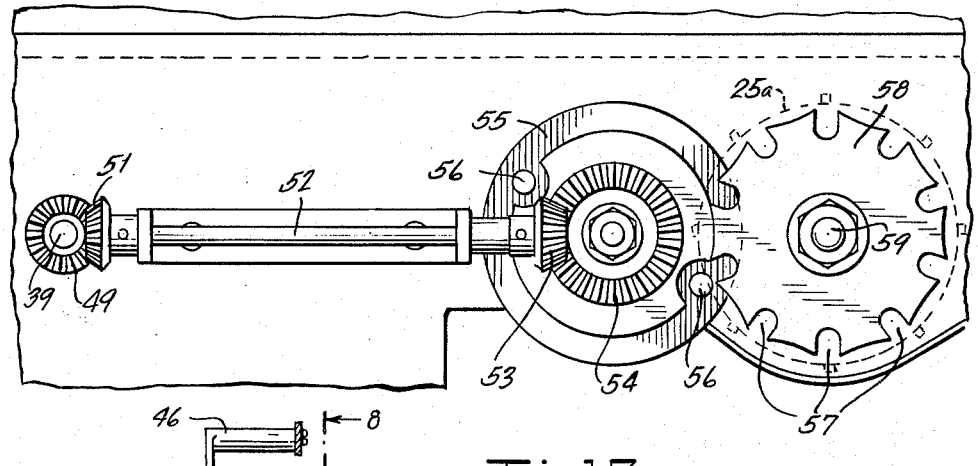
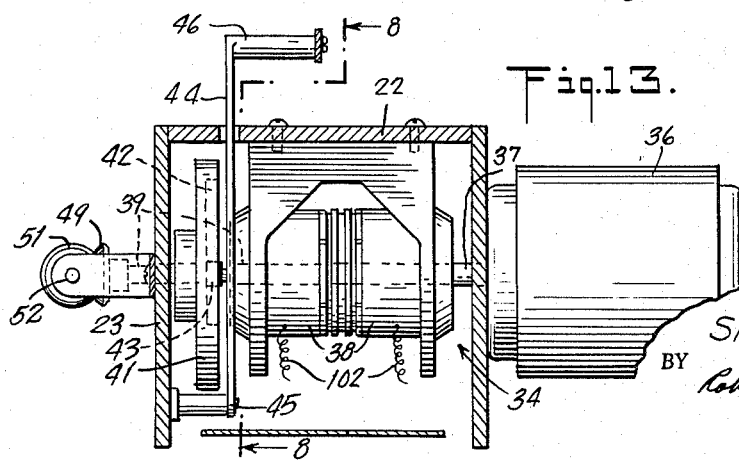

United States Patent Office 3,175,938
Patented Mar. 30, 1965

3,175,938
POULTRY TAGGING DEVICE
Sigurd M. Moberg, East Orange, N.J., assignor to E. J. Brooks Company, Newark, N.J., a corporation of New Jersey
Filed June 5, 1963, Ser. No. 285,729
12 Claims. (Cl. 156—489)

This invention relates to improved means for rapidly tagging poultry being processed for marketing. The invention includes both a tag supply and a tag produced from said supply, and improved means for applying tags to poultry. For convenience, reference hereinafter to a "chicken" shall be understood to refer to any article of poultry.

This invention, also, comprises tagging means in the nature of improvements upon poultry tagging means disclosed in my copending application for patent, Serial No. 167,295, filed January 19, 1962.

The tags referred to have usually been employed to display, on a chicken, the name, trademark and/or limited desired display or advertising matter of a chicken processor customarily printed on the tag. Sometimes, government inspection of the processing plant is indicated upon the tag.

Such tags heretofore have commonly been made of a piece of sheet metal which is clipped onto the chicken or of cardboard which is either tied to the chicken by a string or is provided with a metal clip by which it is fastened to the chicken. One very serious drawback of all prior tags has been that hand application has been the only practicable way to fasten them upon the chicken; always a relatively costly procedure. Apparently, the difficulty of avoiding such hand application has stemmed from the fact that chickens being processed and ready for application of a tag thereto have little or no firm area which would permit satisfactory cooperation between the chicken and a tag-applying machine. This problem of mechanically applying tags to chickens has defied solution for many years.

This invention comprehends the use of flexible web material for the tags rather than relatively stiff sheet metal such as has hitherto been employed for such tags or clips. The web material employed is preferably moisture-resistant paper, although other suitable materials such as, e.g., sheet plastic material or fabric may be used. For convenience, reference hereinafter to "paper" shall be understood to refer to any web material capable of being utilized in the manner herein disclosed.

An important object of this invention is the provision of improved devices for tagging chickens automatically.

Another important object is the practical utilization of paper instead of sheet metal for chicken tags.

Another important object is the provision of an improved form of tag which may be applied mechanically to a chicken but which, under some emergency conditions, may be applied by hand.

Another important object is the provision of an improved method for applying such a tag to a chicken and of apparatus capable of being used to mechanically apply such a tag to a chicken.

Another important object is the provision of such a mechanically applicable tag which cannot be reused in any practicable manner.

The foregoing objects are accomplished by use of the present invention, the essentials of which are included in the accompanying non-limitative drawings.

In the drawings:

FIGURE 1 is a somewhat diagrammatic side elevational view of a device, according to this invention, for automatically applying tags to chickens, this figure being drawn to a smaller scale than the other figures of the drawings.

FIG. 2 is a side elevational view, from the irregular line 2—2 of FIG. 1, of conveyor means for moving chickens to and from tag-applying association with said device.

FIG. 3 is a top plan view of a slide mechanism in said device for operating means for severing a paper tag from a tag-supply web and for applying the severed tag to the leg of a chicken; the parts of said slide mechanism being in their relative positions as before operating to perform the mentioned severing and applying functions.

FIG. 4 is a vertical, central sectional view of said slide mechanism, substantially on the line 4—4 of FIG. 3.

FIG. 5 is a vertical cross-sectional view of said slide mechanism substantially on the irregular line 5—5 of FIG. 3.

FIG. 6 is a view, generally similar to FIG. 3, of said slide mechanism, with the latter's parts, however, in their relative positions as after severing the tag from a tag-supply roll and at the commencement of the operation of applying the severed tag to the leg of a chicken.

FIG. 7 is a view, generally similar to FIGS. 3 and 6, but with the parts of the slide mechanism in their relative positions as immediately upon completion of the application of a tag to a chicken's leg.

FIG. 8 is a more or less diagrammatic, approximately vertical sectional view, substantially on the lines 8—8 in FIGS. 3 and 13, illustrating a cam mechanism for operating paper feed rolls and said slide mechanism; certain parts being omitted to avoid complicating this figure.

FIG. 9 is a fragmentary end elevational view of the tag applying or front end of the device as seen from the left sides of FIGS. 3, 4, and 8.

FIG. 10 is an elevational view of a paper tag severed from the leading end of a supply web of paper.

FIG. 11 is an approximately vertical, cross-sectional view, substantially on the lines 11—11 of FIGS. 3 and 8.

FIG. 12 is a fragmentary side elevational view of a gear and geneva mechanism, as viewed from the top of FIG. 3, for operating feed rolls for feeding paper strip from which tags are cut.

FIG. 13 is an approximately vertical sectional view, substantially on the lines 13—13 of FIGS. 1 and 3, showing a clutch-brake drive for operating the mentioned cam mechanism.

Referring first to FIG. 1, the illustrated embodiment of this invention comprises a frame 21 having a top platform 22 and depending side walls 23.. Beneath the platform and between the side walls are disposed a supply roll 24 of moisture-resistant paper from which tags are cut during operation of the device, paper-feed rollers 25, 25a, for feeding paper from roll 24 to a paper-guiding chute 26 (FIG. 8) at the front end of the frame, and guide rollers 27, 28, 29, 31, and 32 for guiding paper strip P from the roll 24 to and between the feed rollers 25. Said roll and all the mentioned rollers are suitably journaled in parallelism in the side walls 23 in relative positions best indicated in FIG. 1. The rollers 25 and 25a each have similar peripheral series of identically spaced fingers 25x for engagement within similarly spaced perforations in the paper strip P on roll 24 (FIG. 10) to assure precise feeding of the strip through the machine.

The paper strip P is coated on one side (the inner side of an applied tag as hereinafter explained) with an adhesive which is adherent to itself but not to other substances. The uncoated side may bear printing, e.g., trademarks, inspection data, etc.

Upon and toward the front end of the platform 22 is mounted a slide-operated knife and wing assembly 33 for cutting tags from the paper fed through the chute 26 and wrapping the tags about chicken legs L presented adjacent to the front end of the device.

Underneath and toward the center of the platform 22 is mounted a clutch-brake drive mechanism 34 which, by means hereinafter detailed, operates the knife and wing assembly 33 and turns the rollers 25, 25a in such timed relationship that, when a chicken leg is carried by a conveyor to the front end of the device, the knife and wing assembly cuts and applies a tag to the leg and, as the tagged leg is moved away by the conveyor, the rollers 25 feed the paper forwardly to present an area of paper to be cut away as a tag for application to another chicken leg in a succeeding operation. A conveyor 35 serves to move a line of chickens past the front end of the device for application of tags thereto as hereinafter detailed.

The clutch-brake drive mechanism 34 comprises a continuously running electric motor 36 which continuously turns a driving shaft 37, which, through an electrically controllable clutch-brake device 38, truns a driven shaft 39 periodically with the movement of chickens past the machine by the conveyor 35. The clutch-brake device 38 is obtainable in the open market and, per se, does not constitute this invention; hence, it is not disclosed in detail herein.

For each application of a tag to the leg of a chicken, the driven shaft 39 is given a single turn; then said shaft comes to rest until another chicken leg comes into position for application of a tag thereto. Keyed to shaft 39 is a cam disc 41 (FIG. 8) formed with a cam track 42 within which is engaged a cam-following roller 43 carried at an intermediate point of a lever 44 pivoted at its lower end 45 to a fixed point on sidewall 23 of the machine's frame. The upper end 46 of said lever is pivotally connected to one end of a link 47, the other end of which is pivotally connected to a reciprocating rod 48 which, as hereinafter detailed, serves to operate the knife and wing assembly 33. A portion 42a of the cam track 42, concentric with shaft 39, extends approximately 180° about the latter and yields no movement of the lever 44 and the remainder 42b of said cam track is eccentric and, through lever 44, imparts reciprocating motion to the rod 48. Thus, operation of the knife and wing assembly occurs only during one half of each turn of the cam disc 41.

During the half turn of shaft 39 when the knife and wing assembly is idle after having severed one tag and having applied it to one chicken's leg, the paper web P is advanced to the extent of a tag to be applied to a succeeding chicken's leg, such advancing of the web being derived from rotation of the shaft 39. For the latter purpose, bevel gears 49 and 51, keyed on shafts 39 and 52 (FIGS. 3 and 12), and bevel gears 53 and 54, respectively, keyed on shaft 52 and fixed upon a geneva drive wheel 55, serve to turn the latter.

The geneva drive wheel 55 is provided with two studs 56 which engage notches 57 of a geneva driven wheel 58 to drive the latter. Wheel 58 is keyed to shaft 59 to which paper-feed roller 25a is also keyed. The paper-feed rollers 25 and 25a are constrained to turn in unison by a synchronizing shaft 61 and bevel gears 62, 63, 64, 65 suitably keyed to shafts 59 and 61 and to a shaft 66 to which feed roller 25 is keyed.

The knife and wing assembly 33 comprises a pair of wings 67, inter-pivoted upon an upright pivot pin 68 which is fixed at its lower end at a point near the forward end of a flat, slidable knife and wing carrying plate 69 having a flat knife 71 fixed thereto at its forward end in advance of said pivot pin. These wings are slightly larger vertically than the width of a paper tag to be applied to an inverted leg of a chicken. They are formed with opposed semi-circular recesses 72, preferably lined with relatively soft rubber 73 and flaring downwardly and outwardly so that, when the wings are swung forwardly and together, said recesses substantially encircle said leg and conform to the latter's shape to wrap a paper tag about the leg. The rubber lining enables the wings 67 to function with legs of somewhat different thicknesses. Each of the wings is preferably provided with a stud 74, yieldable against a backing spring 75 in a bore 76, for cooperation with a paper tag as hereinafter explained.

The knife and wing carrying plate 69 (hereinafter referred to for convenience as a knife-wing slide), is a part of a slide mechanism 77, which also includes a flat cam plate or slide 78 overlying and spaced above slide 69. The latter slide may rest and slide upon the platform 22 and the two slides may work between side guides 79 which constrain the slides to reciprocate longitudinally of the platform and in parallelism with each other. The side guides include side guide strips 81 having inner ledges (FIG. 5) which serve to separate the slides 69 and 78 sufficiently to accommodate operatively therebetween a flat, bell crank type of lever 82.

The forward end of the reciprocating rod 48 is connected to a bracket 83 fixed upon the rearward end of the cam slide 78 to operate the latter. The rod 48 extends slidably within a bore 84 in said bracket; an integral head 85 at the forward end of rod 48 limits sliding of the latter rearwardly relatively to said bracket; and a compressed coil spring 86 yieldably opposes forward sliding of said rod relatively to said bracket. This spring arrangement serves to prevent jamming of the slide mechanism.

A pair of wing-operating arms 87 are pivoted at their rearward ends upon a vertical pivot pin 88 fixed into the forward end of the cam slide 78 and the forward ends of said arms are separately pivoted to the wings 67 to cause the latter to swing forwardly to close upon a chicken leg when the cam slide 78 is slid forwardly.

The bell crank 82 (FIGS. 3–7) has a first pivot point in an end portion 89 extending into a breach or slot 91 in one of the guide strips 81 and a vertical pin 92, fixed into the adjacent side guide 79, extends within the breach 91 and through a slot 93 in the bell crank's portion 89; the bell crank thereby being pivotable about the fixed pin 92 and being slidable transversely of the slide mechanism 77 to permit certain swinging movements of the bell crank as hereinafter explained.

At a second pivot point of the bell crank, the latter is pivotally connected to the underlying wing and knife carrying slide 69 by a short machine screw 94; and a third pivot point of the bell crank has an upwardly extending stud screw 95 fixed therein and carrying a cam-follower roller 96 which extends into and works in a zigzag shaped cam slot 97 formed in the cam slide 78.

Ignoring some slight lost motion such as would ordinarily be present in the operation of a cam arrangement as detailed in the next preceding paragraph hereof, the forward or tag applying operation of the slide and knife-wing mechanisms is as follows. As the cam slide 78, operated by rod 48, starts moving forwardly, from its FIG. 3 position, the wings 67 start swinging forwardly and the cam follower 96 engages the offset portion 97a of the cam slot 97, thereby dragging the inner part of the bell crank 82 forwardly and consequently moving the wing-knife slide forwardly to cause the knife 71 to sever an upstanding end 98 of paper web, protruding upwardly from chute 26 and, at the same time, bring the interpivoted portions of the wings very close to or against the chicken leg with the severed paper tag disposed therebetween.

After the cam follower 96 upon continued forward movement of the cam slide 78 disengages or clears the offset portion 97a of the cam slot, it slides in a straight tail portion 97b of said slot, having no further operational effect upon the bell crank 82 or upon the knife-wing slide 69, but continued forward movement of the cam slide 78 causes the arms 87 to complete the swinging of the wings 67 to their closed positions encircling the chicken leg as in FIG. 7.

Reverse or rearward movement of the rod 48 causes operation, reverse of that just described, of the knife and wings. It should be noted that a complete cycle of an advance movement and a retraction movement of the knife and wings is very rapid and is completed during passage of a chicken past the front end of the machine on the conveyor 35. However, to assure proper completion of the mentioned cycle, even during relatively fast, continuous operation of the conveyor 35, a stationary impediment member 99 (FIGS. 1 and 2) is mounted in fixed position by any suitable means in the path of rollers 101 of the conveyor and approximately in line with the tag-applying machine. As shown in FIG. 2, the one chicken hung on a conveyor hanger having a roller 101 in engagement with the impediment member 99 is momentarily held back while the related roller 101 rolls over the member 99. After clearing the member 99 (a tag meanwhile having been applied to the impeded chicken), the cleared hanger straightens by gravity.

Control of the tag-applying operations is exerted by a suitable electric operating circuit in the electrically operated clutch and brake portions of the clutch-brake device 38. The supply of electricity to said operating circuit is controlled by a switch circuit suitably connected by wires 102 to the clutch-brake device 38 to which wires two switches are connected in parallel arrangement. These two switches are a first normally open limit switch 103 (FIG. 1) positioned adjacent to the conveyor 35 to be closed for a short time by the conveyor hanger holding a chicken about to have a tag applied thereto; and a second limit switch 104 (FIG. 8), suitably fixed to a sidewall 23 of the frame 21 with the roller 105 of its operating arm seated in a transverse groove 106 formed in an otherwise circular periphery of the cam disc 41. When the roller 105 is seated within the groove 106, the switch 104 is open but when said roller rides upon the circular portion of the cam disc's periphery, the switch 104 is closed. As the mentioned operating and switch circuits are not necessary to an understanding of this invention and, per se, are well known, a diagram of said circuits is not included in the drawings.

A suitable, fixed guide member 107 (FIG. 1) is disposed opposite the front end of the machine to back up and support the chicken leg L in a proper position during application of a tag thereto.

The machine may be rigidly supported in any suitable manner, in a proper, sloping attitude (as in FIG. 1) in relation to the conveyor 35 and to chickens carried thereby. If a ceiling is quite low, the machine may be hung from the ceiling by rigid straps 108, 109, otherwise, the machine may be mounted on a stand on the floor or may be secured by suitable brackets to the track 35a of the conveyor.

In generally considering the operation of the device, it may be assumed that, at the commencement of a cycle of operation, motor 36 is in continuous operation, that electric switch 103 is not in engagement with any chicken hanger of the conveyor and therefore is open, that the roller 105 of electric switch 104 is seated in the groove 106 and therefore the latter switch is open, and that the clutch-brake device 38 is in non-clutch condition so that cam disc 41 is at rest. Also, as a result of a terminal portion of a preceding tagging operation, an upstanding forward end 98 of the paper web is in position to be cut from the web and applied as a tag to a chicken leg.

With the continuous operation of conveyor 35, the conveyor hanger carrying the next chicken to be tagged engages and temporarily closes switch 103, thereby causing clutch engagement of the clutch-brake device 38 to start rotation of the cam disc 41 in the direction of the arrow applied thereto in FIG. 8. This causes switch roller 105 to rise out of groove 106 thereby closing switch 104, this occurring before disengagement of switch 103 from the mentioned conveyor hanger, so that during substantially a full turn of the cam disc, switch 104, coacting with the periphery of said disc, remains closed and maintains the clutching effect necessary to complete a full turn of the cam disc.

During the first quarter turn of the cam disc, a first half of the eccentric portion of the latter's cam track causes the lever 44 to swing forwardly and uninterruptedly pushes cam slide 78 forwardly to yield the already fully described cutting of the paper web and the advancing and closing operation of the wings 67 to cause the latter to press the severed paper about the chicken leg and to press the opposite, facing ends of the severed paper together into firm adhering relationship as an applied tag. It may be noted that during the closing of said wings, the latter's studs 74 enter the perforations P′ of the severed paper and thereby assure that the ends of the severed paper will go together in proper alignment; the studs 74 retracting into the wings 67 when the latter close completely.

During the turning of the cam disc 41, the gearing 49, 51, 53, 54 turns the geneva drive wheel 55, but the latter's studs 56 cause the geneva driven wheel 58 to turn (and then interruptedly) only during the last three fourths of a single turn of the cam disc. As the turning of geneva driven wheel 58 directly causes turning of paper-feed roller 25a and indirectly, through synchronizing gearing 62, 63, 64, and 65, causes synchronized turning of paper-feed roller 25, the paper web, through engagement of fingers 25x of the feed rollers within the web's perforations P′, is precisely fed forwardly. This forward feeding of the paper occurs only after retraction of the knife 71 to a point rearward of the chute 26 and all the mentioned gearing is so designed as to give such operation of the geneva mechanism as will advance the paper web precisely to the extent of the width of one tag during a single turn of the cam disc 41.

The mentioned retraction of the knife and the opening of the wings are accomplished by retraction of the cam slide through rearward operation of the lever 44 and the rod 48 by a second half of the eccentric portion of the cam track 42, this retraction operation being opposite to the described slide-advancing operation. The retraction operation becames completed at the end of the first half turn of the cam disc 41, when the cam-follower roller 43 leaves the cam track's eccentric portion 42b and enters its concentric portion 42a. During the last half of the single turn of the cam disc, while the roller 43 is in the concentric track portion 42a, the slide mechanism is at rest, but the geneva mechanism is completing the advancement of the paper strip to the extent necessary to provide a properly upstanding paper portion 98 to serve as a tag to be applied in the next succeeding cycle of operation.

The cycle of operation being described terminates as the switch roller 105 reaches and drops into groove 106 to open switch 104 and thereby cause unclutching and braking to occur in the clutch-brake device 38 to bring the cam disc 41 to rest as shown in FIG. 8 in readiness to function again in a succeeding tagging cycle of the character just described. Such cycles follow rapidly as the conveyor 35 brings chickens successively to the machine for tagging.

It will be realized that the concepts disclosed herein may be utilized in various other ways without, however, departing from the invention as set forth in the following claims.

I claim:

1. A poultry-tagging device for applying paper tags to legs of chickens carried by a conveyor past the forward end of the device, said device being held against movement in parallelism with the conveyor and comprising paper-feeding means for intermittently feeding tag portions of a paper strip to a tag-applying position between a chicken's leg, on the conveyor, and the forward end of the device, a slide mechanism including a reciprocable first slide member, movable in a continuous advance movement transversely of the line of movement of the conveyor, actuating means for reciprocating said slide member, a second slide member reciprocable in parallelism with the first slide member, a pair of arcuatefaced wings pivotally mounted, at their innner ends, toward the forward end of the second slide member for pivotal movement in opposition to each other to close them, with a paper tag therein, about a chicken's leg, a linkage between the two slide members adapting the second of said members to be moved forwardly in response to a first part of forward movement of the first of said members, while said wings are in open positions, to bring the latter's pivotally mounted outer ends to positions adjacent to a chicken leg, and wing-operating means, coacting between a forward portion of the first slide member and said wings during a latter part of forward movement of the first slide member, for pivoting said wings about the chicken leg to apply, to the latter, a paper tag disposed within the wings.

2. A poultry-tagging device according to claim 1, said wings having yieldable studs protruding from their inner arcuate faces, adapted to project into perforations in the paper strip during closing of the latter and said wings upon said leg.

3. A poultry-tagging device according to claim 1, further including guide means arranged to guide a leading end portion of the paper strip to a position forwardly of the pivotal mountings of said wings and in line with said wings with the plane of said leading strip portion extendng transversely to the line of forward movement of said wings, and a knife mounted upon the forward end of said second slide member and extending transversely of said strip, said knife being adapted to cut said leading end portion from the strip during forward movement of the second slide member to form a paper tag to be applied by said wings to said leg.

4. A poultry-tagging device according to claim 1, said wing-operating means comprising a pair of arms pivotally interconnected toward their rearward ends and to said first slide member toward the latter's forward end and pivotally connected separately at their forward ends to the two said wings.

5. A poultry-tagging device according to claim 1, said linkage comprising a cam slot in the first slide member extending generally in the direction of the latter's line of movement, and a cam follower slidable in said slot and connected to said second slide member; said slot having a forward portion extending obliquely to the line of movement of the first slide member and adapted, during said first part of the latter's forward movement, to move said cam follower forwardly and thereby move the second slide member forwardly, and said slot having a rearward portion extending parallel to the first slide member's movement to enable the latter, in a latter part of its forward movement, to move independently of the second slide member to close said wings.

6. A poultry-tagging device according to claim 5, further including a bell crank having three extremities in triangular inter-relationship, a first of said extremities being pivotally connected to said second slide member, a second of said extremities having said cam follower mounted thereon, and a third of said extremities being pivotally connected at a point which is stationary with respect to both said slide members; said bell crank being angularly movable during said first part of the first slide member's forward movement to enable said follower to shift sidewisely from the obliquely extending forward portion of the cam slot into the latter's said rearward portion.

7. A poultry-tagging device according to claim 1, further including control means coacting with said actuating means and timed to movement of a chicken leg carried by the conveyor to cause intermittent feeding of the paper strip and application of tags to chicken's legs to occur in timed relation to presentation of chicken legs to the device by the conveyor.

8. A poultry-tagging device according to claim 1, further including an impediment member positioned adjacent to the line of movement of chicken legs on said conveyor and adapted to impede the movement of chicken legs at the forward end of the device during application of tags to said legs.

9. A poultry-tagging device according to claim 1, said actuating means including a rotary cam, motion-transmitting means, actuated by said cam and coacting with said first slide member to actuate the latter, and a motor connected to said rotary cam to rotate the latter; said device further including a motor-control element, operationally responsive to movement of a chicken leg on said conveyor and connected to said motor, said motor-control element being adapted to initiate operation of said motor to move said operating means forwardly.

10. A poultry-tagging device according to claim 9, further including a second motor-control element, connected to said motor and coacting with said rotary cam to discontinue operation of said motor at the end of rearward movement of said first slide member, said two motor-control elements being connected in parallel to said motor and said second motor-control element being adapted to coact with said cam subsequent to initiation of operation of said motor to maintain the latter in operation during the forward and rearward movements of said first slide member.

11. A poultry-tagging device according to claim 9, said paper-feeding means comprising a paper feed roller which the paper strip engages in the latter's feeding movement, and second motion-transmitting means coacting between said rotary cam and said roller for transmitting the rotary motion of said cam to said roller whereby to cause the latter to urge the paper strip toward its said tag-applying position.

12. A poultry-tagging device according to claim 11, said second motion-transmitting means comprising a geneva drive wheel having driving stud means thereon and a geneva driven wheel having peripheral notches engageable by said stud means for deriving rotation of said driven wheel from said drive wheel; said stud means and notches being adapted to interact to turn the driven wheel only during rearward movement of said first slide member.

References Cited by the Examiner
UNITED STATES PATENTS

| | | | |
|---|---|---|---|
| 2,683,549 | 7/54 | Phin et al. | 156—492 |
| 3,021,653 | 2/62 | Marshall | 156—521 |

EARL M. BERGERT, *Primary Examiner.*

Dedication 3,175,938.—*Sigurd M. Moberg*, East Orange, N.J. POULTRY TAGGING DEVICE. Patent dated Mar. 30, 1965. Dedication filed Feb. 9, 1972, by the assignee, *E. J. Brooks Company*.

Hereby dedicates to the Public the term thereof remaining after Oct. 1, 1970.

[*Official Gazette June 13, 1972.*]